United States Patent

Kim

[19]

[11] Patent Number: 5,892,548
[45] Date of Patent: Apr. 6, 1999

[54] ADAPTIVE QUANTIZER WITH MODIFICATION OF HIGH FREQUENCY COEFFICIENTS

[75] Inventor: Jong-Il Kim, Seoul, Rep. of Korea

[73] Assignee: Daewoo Electronics Co., Ltd., Seoul, Rep. of Korea

[21] Appl. No.: 777,125

[22] Filed: Dec. 30, 1996

[30] Foreign Application Priority Data

Apr. 30, 1996 [KR] Rep. of Korea ............... 1996-13773

[51] Int. Cl.$^6$ ............................................. H04N 7/30
[52] U.S. Cl. ............................................. 348/405
[58] Field of Search ............... 348/405, 419, 348/416, 415, 409, 402, 401, 400, 390, 384; 382/251; 341/200; H04N 7/133

[56] References Cited

U.S. PATENT DOCUMENTS

| | | | |
|---|---|---|---|
| 5,046,121 | 9/1991 | Yonekawa | 382/250 |
| 5,333,012 | 7/1994 | Singhal et al. | 348/405 |
| 5,426,512 | 6/1995 | Watson | 358/426 |
| 5,440,344 | 8/1995 | Asamura | 348/405 |
| 5,473,377 | 12/1995 | Kim | 348/405 |
| 5,543,848 | 8/1996 | Murakami | 348/405 |

FOREIGN PATENT DOCUMENTS 0 514 663  11/1992  European Pat. Off. .
0 673 172  9/1995  European Pat. Off. .

OTHER PUBLICATIONS

Chen and Pratt, "Scene Adaptive Coder", IEEE Transactions on Communications, vol. COM–32, No. 3, pp. 225–232, Mar. 1984.

International Standards Organization (ISO) Standard Committee Draft 11172–2, pp. D–38 and D–39, Mar. 1992.

*Primary Examiner*—Bryan Tung
*Attorney, Agent, or Firm*—Pennie & Edmonds LLP

[57] ABSTRACT

A video signal encoding system, for encoding a video signal to provide an encoded signal, includes a transform coder for encoding the video signal on a block-by-block basis to generate blocks of transform coefficients, wherein the video signal includes a multiplicity of frames, each frame having blocks of pixels. A quantizer employed in the video signal encoding system comprises a quantization parameter deciding block; a quantizer control block for deciding a quantization mode signal which represents an activity of the video signal; and a quantizer which classifies transform coefficients included in each block into high frequency coefficients and low frequency coefficients based on the quantization mode signal, modifies the high frequency coefficients, to thereby provide blocks of modified transform coefficient, and quantizes the blocks of modified transform coefficients by using the quantization parameter.

18 Claims, 4 Drawing Sheets

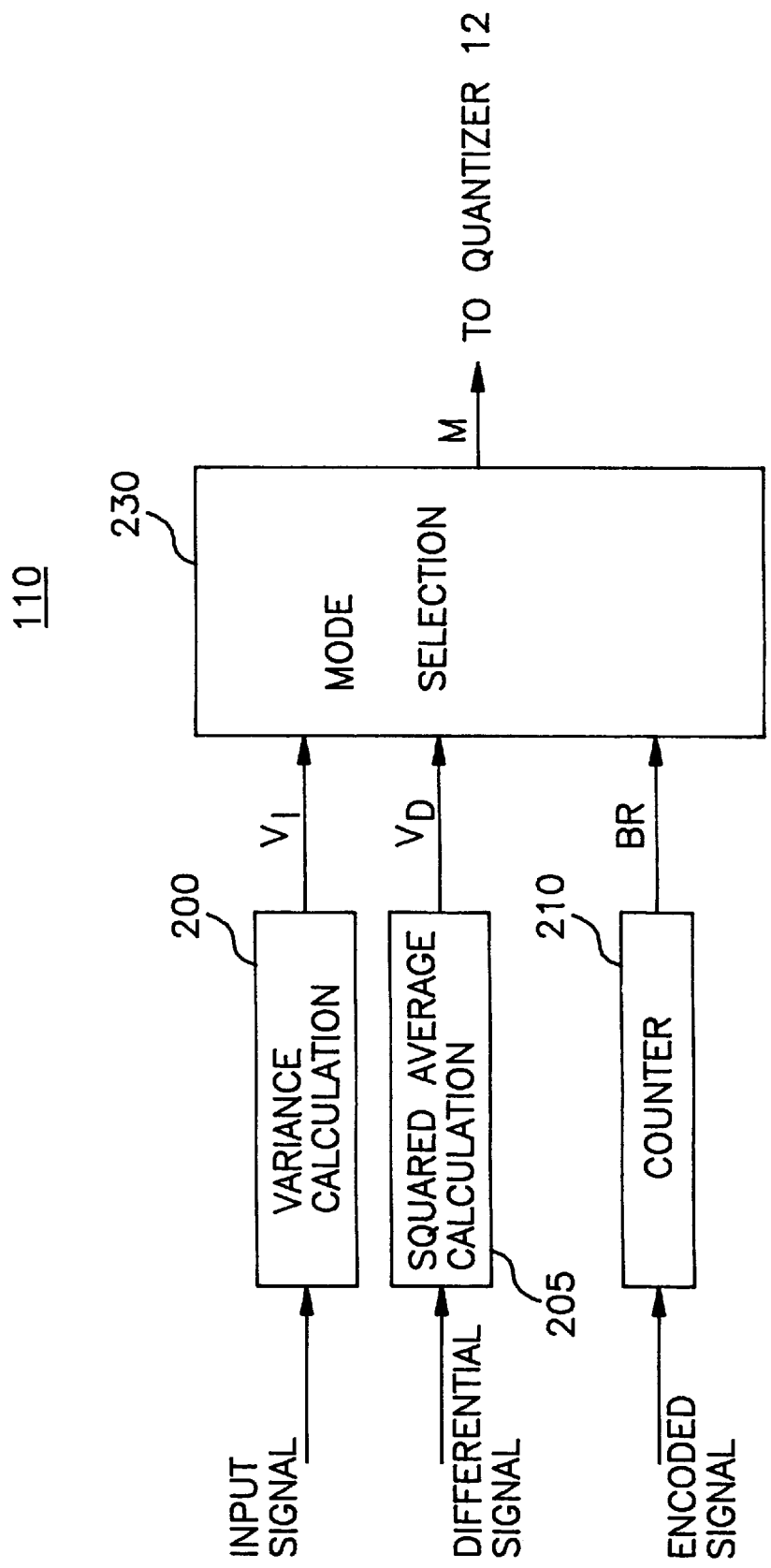

ADAPTIVE QUANTIZER WITH MODIFICATION OF HIGH FREQUENCY COEFFICIENTS

FIELD OF THE INVENTION

The invention relates to a video signal encoding system; and, more particularly, to an apparatus for adaptively adjusting step sizes for quantizing transform coefficients derived from a video signal to be transmitted, to thereby improve the quality of the transmitted video signal.

DESCRIPTION OF THE PRIOR ART

In various electronic applications such as high definition TV and video telephone systems, a video signal may be transmitted in a digital form. When the video signal comprising a sequence of video "frames" is expressed in a digital form, there occurs a substantial amount of digital data: for each line of a video frame is defined by a sequence of digital data elements referred to as "pixels". Since, however, the available frequency bandwidth of a conventional transmission channel is limited, in order to transmit the substantial amounts of digital data through the fixed channel, a video signal encoding system is normally used to compress the digital data.

Conventional video signal encoding system typically includes a transform coder, e.g., DCT (Discrete Cosine Transform) coder, which sequentially converts a plurality of blocks of, e.g., 8×8, pixels contained in the video signal into a plurality of blocks of 8×8 transform coefficients. This DCT coder is described in, for example, Chen and Pratt, "Scene Adaptive Coder", *IEEE Transactions on Communications*, *COM*-32, No. 3(March 1984). The transform coefficient blocks are sequentially processed with a quantizer wherein they are converted into quantized transform coefficients.

In the video signal encoding system, the manner of quantizing the blocks of transform coefficients, determines the bit rate of the encoded signal and dictates the quality of the video signal reconstructed from the encoded signal. In the conventional quantizer, the quantization step size can be controlled by using a so-called quantization parameter ("Qp") as set forth in the video coding syntax of the Motion Picture Expert Group (MPEG) contained in the International Standards Organization(ISO) Standard Committee Draft 11172-2.

The quantization step size directly controls the bit rate of the encoded signal and the coarseness/fineness of the quantization employed in developing the encoded signal. That is, a smaller quantization step size entails a larger amount of encoded data requiring a larger number of code bits for the representation thereof, whereas a larger quantization step size results in a lower volume of encoded data needing a fewer number of code bits for their representation. A larger number of code bits can represent a video signal more precisely than a fewer number of code bits. Therefore, in order to achieve a maximum picture quality for a particular predetermined target bit rate, it is crucial to select the quantization step size appropriately.

In FIG. 1, there is shown a conventional video signal encoding system. The video signal encoding system eliminates redundancies in a frame of the video signal and/or between two frames of the video signal in order to compress the video signal to a more manageable size for transmission.

A current frame of an input signal which is generated from a video signal source, e.g., video camera(not shown), is applied to a subtractor 50 in successive blocks for the processing thereof on a block-by-block basis. Each block has a plurality of data elements, e.g., 8×8 pixels. In an inter mode, a predicted frame is extracted at a motion compensation block ("MC") 40 by using a conventional motion estimation and compensation and then coupled to the subtractor 50, which generates a differential signal between the current frame and the predicted frame. The differential signal is fed to a compressor 10 which includes a discrete cosine transform ("DCT") block 11 and a quantization block 12, and transform coded and quantized therein to generate quantized transform coefficients. The quantized transform coefficients are then coupled to a variable length coding ("VLC") block 70 which serves to generate an encoded signal by using, e.g., a run-length coding and a Huffman coding, to be transmitted via a transmission buffer 80 to a receiver(not shown). On the other hand, the quantized transform coefficients are also coupled to a decompressor 20 which includes an inverse quantization block and an inverse DCT block(not shown) and is reconstructed back to the differential signal therein. The reconstructed differential signal is then coupled to an adder 60 wherein it is combined with the predicted frame provided from the motion compensation block 40 and reconstructed to a frame of video signal identical to the current frame prior to its compression. The reconstructed current frame is coupled through a frame store block 30 back to the motion compensation block 40 as a previous frame which is used in extracting the predicted frame for processing a subsequent frame of the video signal.

In an intra mode, the function of the video signal encoding system 100 is similar to that of the inter mode except that the current frame instead of the differential signal between the current frame and the predicted frame is fed to the compressor 10 and coded therein.

Turning now to the details of the quantization block 12, it stores a base quantizer step size matrix. The base quantizer step sizes, which are the elements of the base quantizer step size matrix, are arranged so that one base quantizer step size corresponds to one of the transform coefficients contained in each transform coefficient block.

The quantization block 12 receives a quantization parameter, Qp, from a quantization parameter deciding block 90. The quantization block 12 uses the base quantizer step size matrix and Qp to generate the quantized transform coefficients, as its output. The actual quantization step size to be employed for quantizing each coefficient included in the block is developed by multiplying the value of Qp with the respective element of the base quantizer step size matrix. At the quantization parameter deciding block 90, the quantization parameter Qp is decided based on, e.g., the level of fullness of the buffer 80 and a variance or complexity of the input video signal.

In the prior art apparatus described above, although the quantization parameter may be readjusted in the course of encoding the video signal, a same quantization parameter is used in quantizing a block of transform coefficients. Further, a predetermined base quantization step size matrix is employed for encoding a sequence of video frames(see International Standard organization Standard Committee Draft 11172-2). Therefore, the ratio of the quantization step sizes for two transform coefficients included in a block is fixed in a sequence of video frames.

SUMMARY OF THE INVENTION

It is, therefore, a primary object of this invention to provide an improved video signal encoding system wherein a highly enhanced picture quality is attained by adaptively quantizing transform coefficients included in a block utilizing the characteristics of a video signal.

In accordance with the invention, there is provided a quantizer for use in a video signal encoding system which encodes a video signal to provide an encoded signal and includes a transform coder for encoding the video signal on a block-by-block basis to generate blocks of transform coefficients, wherein the video signal includes a multiplicity of frames, each frame containing a number of slices, each slice being divided into a plurality of macroblocks, each macroblock having blocks of pixels, the quantizer comprising:

a quantization parameter deciding block;

a quantizer control block for deciding a quantization mode signal which represents an activity of the video signal;

a quantizer which classifies transform coefficients included in each block into high frequency coefficients and low frequency coefficients based on the quantization mode signal, modifies the high frequency coefficients, to thereby provide blocks of modified transform coefficients including the low frequency coefficients and the modified high frequency coefficients, and quantizes each block of modified transform coefficients by using the quantization parameter.

BRIEF DESCRIPTION OF THE DRAWINGS

The above and other objects and features of the present invention will become apparent from the following description of preferred embodiments given in conjunction with the accompanying drawings, in which:

FIG. 3 illustrates a detailed block diagram of a quantizer control block shown in FIG. 2.

DETAILED DESCRIPTION OF THE PREFERRED EMBODIMENTS

Figure 1:
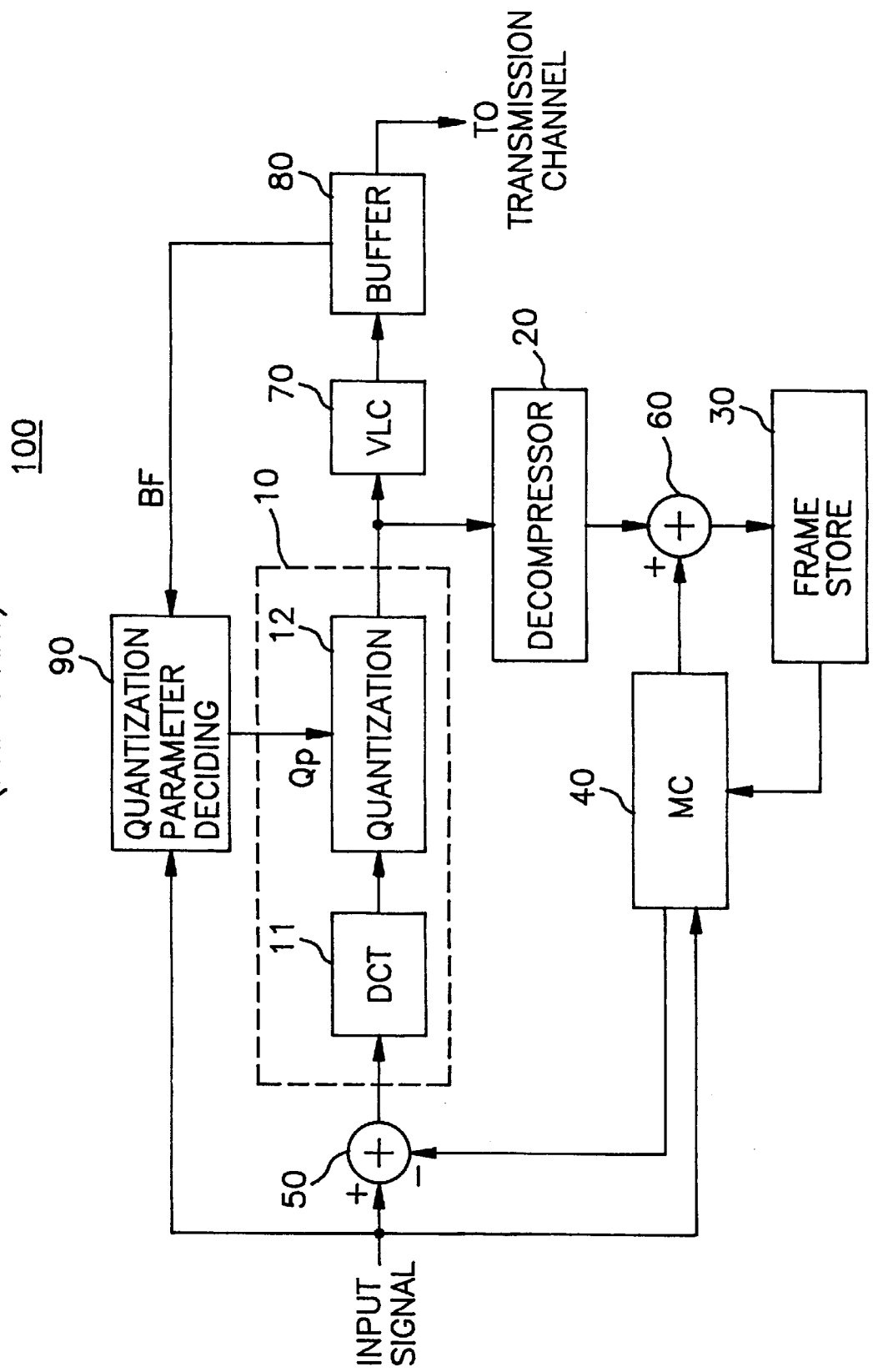
FIG. 1 represents a schematic block diagram of a conventional video signal encoding system.
Figure 2:
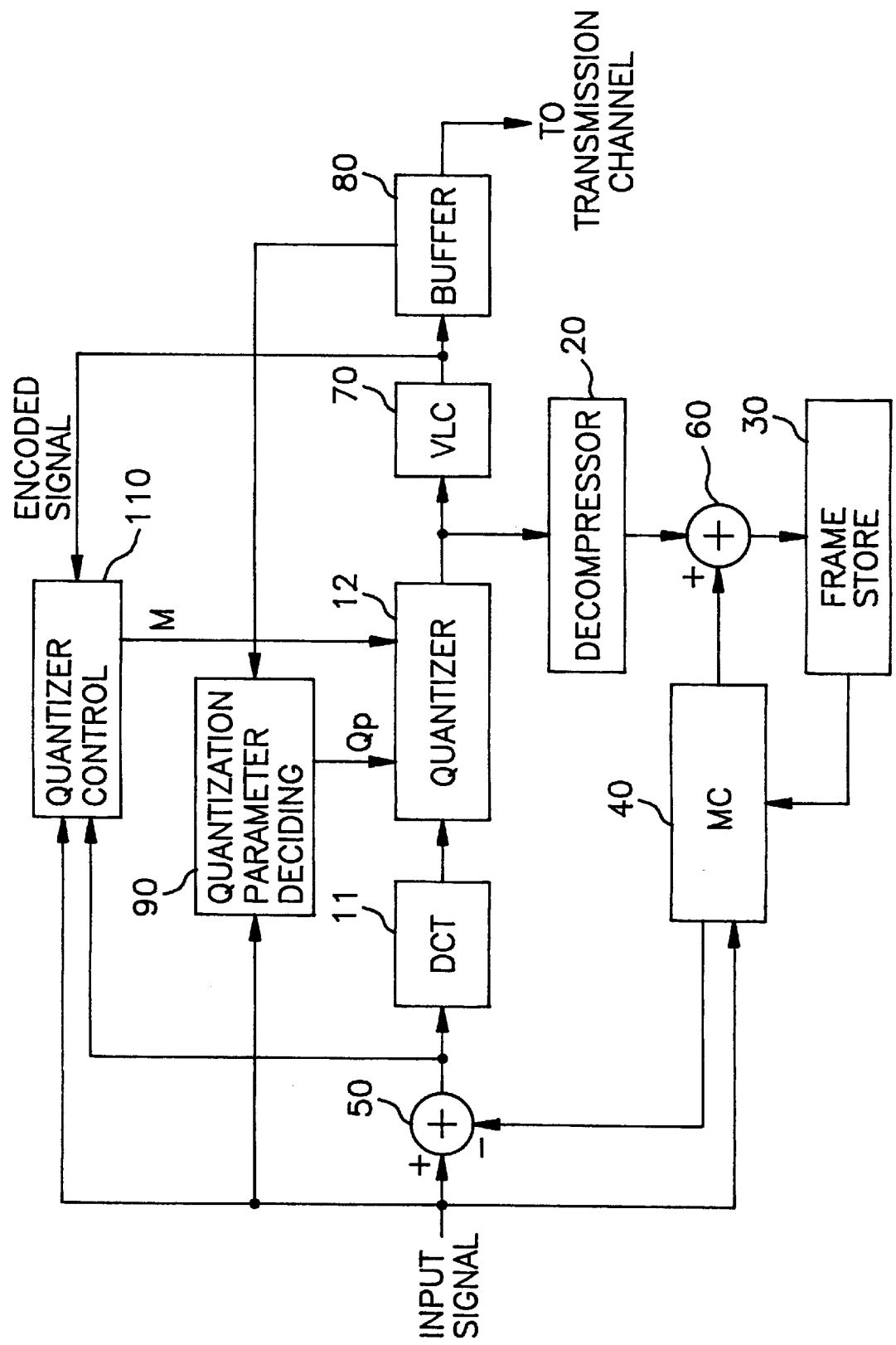
FIG. 2 shows a schematic block diagram of a video signal encoding system in accordance with the present invention.

Referring to FIG. 2, there is shown a schematic block diagram of a video signal encoding system in accordance with the present invention. The apparatus includes a discrete cosine transform ("DCT") block 11, a frame store block 30, a motion compensation ("MC") block 40, a subtractor 50, an adder 60, a variable length coding ("VLC") block 70, a buffer 80 and a quantization parameter deciding block 90 which are essentially identical to those included in the conventional video signal encoding system shown in FIG. 1. It further includes a quantizer 12 which quantizes blocks of transform coefficients provided from the DCT block 11 by using a quantization parameter Qp provided from the quantization parameter deciding block 90 and a quantization mode signal M provided from a quantizer control block 110.

At the quantization parameter deciding block 90, the quantization parameter Qp is determined in a conventional way by using, e.g., a buffer fullness and a variance of an input signal. The quantizer control block 110 receives, e.g., the input signal, a differential signal provided from the subtractor 50, and an encoded signal provided from the VLC block 70, and decides the quantization mode signal based on them, as will be described with reference to FIGS. 3 to 4B. The quantization mode signal has one of N predetermined values, N being a positive integer, e.g., 4, and represent an activity of the input signal. Specifically, the quantization mode signal is related to a complexity of the input signal and/or an amount of bits used in encoding the image signal, and so on.

Figure 4A:
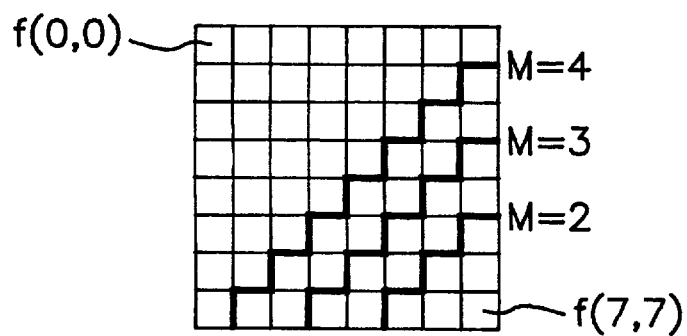
FIGS. 4A and 4B provide a scheme for classifying the transform coefficients into high frequency coefficients and low frequency coefficients.
Figure 4B:
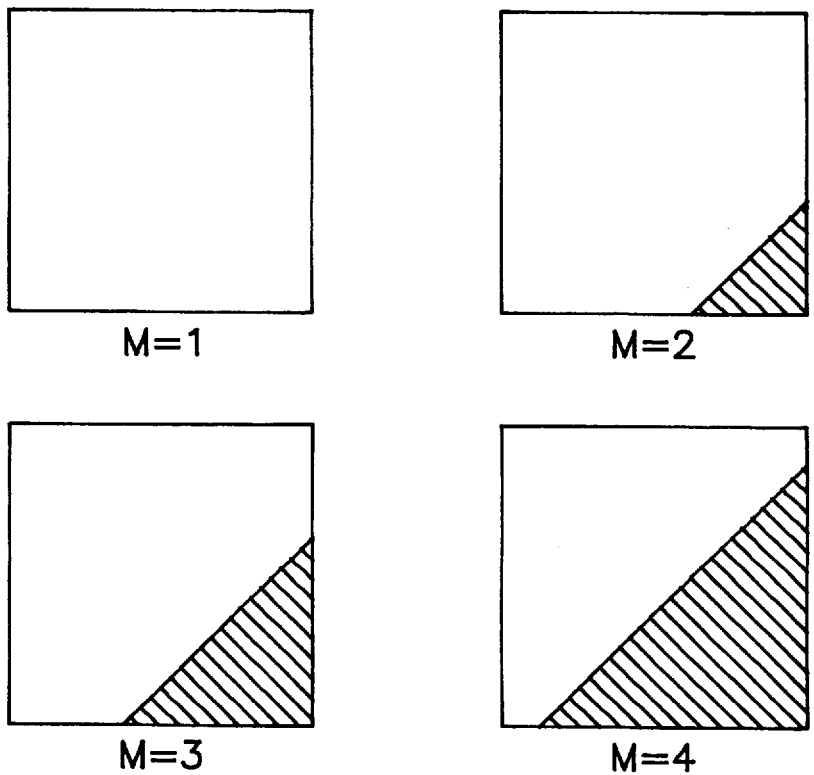

At the quantizer 12, transform coefficients included in a block are first divided into two sets, i.e., a set of low frequency coefficients and a set of high frequency coefficients, in response to the quantization mode signal. Referring to FIG. 4A, an exemplary method for dividing a block of transform coefficients into the two sets is depicted in case N=4. As shown in FIG. 4A, in case the value of the quantization mode signal ("M") is 1, all coefficients in a block are classified as the low frequency coefficients; in case M is 2, 58 coefficients, i.e., F(i,j)'s, i and j being nonnegative integers and (i+j) being smaller than 12, are classified as the low frequency coefficients and the remaining coefficients are classified as the high frequency coefficients. Similarly, in case M is 3 and 4, F(i,j)'s, (i+j) being smaller than 10 and 8, respectively, are classified as the low frequency coefficients. Referring to FIG. 4B, the low frequency coefficients are represented as blank regions and the high frequency coefficients are represented as hatched regions.

After the classification, while the low frequency coefficients are quantized in a conventional method, the high frequency coefficients are processed in a different manner.

In an embodiment of the present invention, the high frequency coefficients are divided by a number larger than 1, e.g., 2, before quantization. It means that, in the present invention, the high frequency coefficients are more coarsely quantized than the conventional method.

In another embodiment of the present invention, the high frequency coefficients are set to 0 before quantization. That is, the high frequency coefficients are not encoded. After the high frequency coefficient are modified as described above, a modified block including the low frequency coefficients and the modified high frequency coefficients is quantized by using quantization step sizes which are developed by multiplying the value of Qp with the respective elements of the base quantizer step size matrix.

As a result, the coarse/fine quantization can be adaptively performed in accordance with the value of the quantization mode signal: that is, as M gets larger, a more course quantization than the conventional method is performed for a larger portion of a block of transform coefficients. Accordingly, an amount of bits representing the input signal is effectively controlled without much degrading the picture quality.

Referring to FIG. 3, there is shown a block diagram of the quantizer control block 110 shown in FIG. 2, which provides the quantization mode signal M based on the input signal, the differential signal provided from the subtractor 50, and/or the encoded signal provided from the VLC block 70.

The input signal is coupled to a variance calculation block 200 which calculates variance $V_I$ of a frame of the input signal, which will be referred to as a processing frame, as follows:

$$V_I = \frac{\sum_{i=1}^{i=I} \sum_{j=1}^{j=J} [I(i,j) - AVE(I)]^2}{I \cdot J} \quad \text{Eq. (1)}$$

wherein I and J are positive integers representing the number of lines included in a frame and the number of pixels included in a line, respectively; i and j are positive integers identifying a position of a pixel in a frame; I(i,j) is a pixel value of the processing frame on position (i,j); and AVE(I) is an average of the pixel values included in the processing frame.

The differential signal is coupled to a squared average calculation block 205 which calculates a squared average $V_D$ of the differential signal between the processing frame and a predicted frame of the processing frame, as follows:

$$V_D = \frac{\sum_{i=1}^{i=I} \sum_{j=1}^{j=J} D(i,j)^2}{I \cdot J} \quad \text{Eq. (2)}$$

wherein I, J, i, and j are same as those of Eq. (1); and D(i,j) is a differential pixel value, i.e., a value of the differential signal for the position (i,j).

The encoded signal is coupled to a counter 210 wherein the amount of data, e.g., the number of bits B, contained in an encoded processing frame is counted, to provide a bit amount B. Then, a bit amount ratio BR is obtained as follows:

$$BR = B/AF$$

wherein AF is an average bit amount of a frame defined as, e.g., $$AF(bits) = TR(bits/sec)/FR(1/sec)$$

wherein TR is a transmission rate of the video signal encoding system, e.g., a transmission capacity of a transmission line or a storing capacity of a storage device which are coupled to the video signal encoding system; and FR is a frame rate thereof.

$V_I$, $V_D$, and BR are provided to the mode selection block 230, and the quantized mode signal M is decided based thereon on a, e.g., frame basis.

At the mode selection signal 230, various schemes can be used to provide the quantization mode signal M.

For example, M may be decided as follows:

$$ACT = W1 \times V_I + W2 \times V_D + W3 \times BR. \quad \text{Eq (3)}$$

$$\begin{aligned} M = 1 &\quad \text{if } ACT < TH1 \\ 2 &\quad \text{if } TH1 \leq ACT < TH2 \\ 3 &\quad \text{if } TH2 \leq ACT < TH3 \\ 4 &\quad \text{if } TH3 \leq ACT \end{aligned}$$

wherein W1 to W3 are predetermined weight values; and TH1 to TH4 are predefined threshold values. The activity value ACT decided by Eq. (3) is related to the complexity or activity of the processing frame and the amount of data used in representing the processing frame.

For another example, M may be decided as follows:

$$\begin{aligned} M = 1 &\quad \text{if } ACT < AVE(ACT) \\ 2 &\quad \text{if } AVE(ACT) \leq ACT < AVE(ACT) + STD(ACT) \\ 3 &\quad \text{if } AVE(ACT) + STD(ACT) \leq ACT < AVE(ACT) + 2STD(ACT) \\ 4 &\quad \text{if } AVE(ACT) + 2STD(ACT) \leq ACT \end{aligned}$$

wherein ACT is calculated as given in Eq. (3); AVE(ACT) and STD(ACT) are an average and a standard deviation of ACT's for L preceding frames of the processing frame, L being a positive integer, e.g., 30. To do this, the mode selection block 230 may include a memory for storing the value of ACT for the L preceding frames and a block for calculating AVE(ACT) and STD(ACT).

By changing the weight values, M may be decided in a different manner. For example, if W1 and W2 are 0, only the bit amount ratio BR is reflected in deciding the quantization mode signal. In case the processing block is intra coded, W2 may be set to 0 since the differential signal is not available in the intra mode.

After M is decided, it is used in quantizing a frame following the processing frame. That is, in quantizing a current frame of the image signal, M determined based on a preceding frame of the current frame is utilized.

Though the quantization mode signal is updated for each frame in this illustrative embodiment, it is possible to update the quantization mode signal for each macroblock or for each slice in a similar manner described herein. To achieve this, the variance $V_I$, the squared average $V_D$, and B should also be decided on a macroblock or a slice basis; AVE(ACT) and STD(ACT) may be an average and a standard deviation of ACT's for L' preceding macroblock or slice of a processing macroblock or slice, L' being a positive integer; and M of the processing macroblock or slice is used in quantizing a macroblock or a slice following the processing macroblock or slice, respectively.

In addition to $V_I$, $V_D$, and BR, other values, e.g., an average of Qp's for the processing frame, can be utilized in deciding the quantization mode signal M. To do this, Qp is provided from the quantization parameter deciding block 90 to the quantizer control block 110 and Qp's for the processing block are stored and averaged at the quantizer control block 110.

By using the inventive quantization scheme, the overall subjective quality of a video frame signal can be enhanced since the coarse/fine quantization can be adaptively performed in accordance with an activity of the input signal.

While the present invention has been described with respect to certain preferred embodiments only, other modifications and variations may be made without departing from the spirit and scope of the present invention as set forth in the following claims.

What is claimed is:

1. A quantizer for use in a video signal encoding system which encodes a video signal to provide an encoded signal and includes a transform coder for encoding the video signal on a block-by-block basis to generate blocks of transform coefficients, wherein the video signal includes a multiplicity of frames, each frame containing a number of slices, each slice being divided into a plurality of macroblocks, each macroblock having blocks of pixels, the quantizer comprising:

means for determining a quantization parameter for each macroblock:

means for deciding a quantization mode signal which represents an activity of the video signal;

means for classifying transform coefficients included in each block into high frequency coefficients and low frequency coefficients based on the quantization mode signal;

means for modifying the high frequency coefficients, to thereby provide blocks of modified transform coefficients including the low frequency coefficients and the modified high frequency coefficients; and means for quantizing the blocks of modified transform coefficients by using the quantization parameter, wherein the modification means includes means for dividing the high frequency coefficients by A, A being a number of a value larger than 1.0.

2. The quantizer of claim 1, wherein the decision means includes means for calculating a variance of pixel values included in a processing frame included in the video signal.

3. The quantizer of claim 2, wherein the decision means further includes means for calculating an average of squares of differential pixel values which are obtained by subtracting pixel values of a predicted frame of the processing frame obtained by using a motion estimation and compensation technique from the pixel values of the processing frame.

4. The quantizer of claim 3, wherein the decision means further includes:

means for counting an amount of bits used in representing an encoded processing frame, to thereby provide a bit amount B; and means for providing a bit amount ratio BR defined as, $$BR=B/(TR/FR),$$

wherein TR is a transmission rate of the video signal encoding system and FR is a frame rate thereof.

5. The quantizer of claim 4, wherein the quantization mode signal has an integer value M ranging from 1 to 4; a block of transform coefficients is represented as F(i,j)'s, i and j being integers ranging from 0 to 7, respectively; and F (i,j) 's are classified as the low frequency coefficients, if (i+j) is smaller than K1, K2, K3 and K4 for M=1, 2, 3 and 4, respectively, K1, K2, K3, and K4 being positive integers with $K4 \leq K3 \leq K2 \leq K1$.

6. The quantizer of claim 5, wherein K1, K2, K3 and K4 are 15, 12, 10, and 8, respectively.

7. The quantizer of claim 5, wherein the decision means further includes:

means for calculating an activity value ACT according to $$ACT=W1 \times V_I + W2 \times V_D + W3 \times BR$$

wherein $V_I$, $V_D$ and BR represent the variance, the average of the squares and the bit amount ratio, respectively; and W1, W2 and W3 are predetermined weight values; and means for selecting the value of the quantization mode signal based on the activity value.

8. The quantizer of claim 7, wherein the selection means contains means for deciding the quantization mode signal as:

$M = 1$    if $ACT < TH1$ 2    if $TH1 \leq ACT < TH2$ 3    if $TH2 \leq ACT < TH3$ 4    if $TH3 \leq ACT$ wherein TH1, TH2, and TH3 and TH4 are predefined threshold values, respectively.

9. The quantizer of claim 7, wherein the selection means contains:

means for storing the activity values for L preceding frames of the processing frame, L being a positive integer;

means for calculating AVE(ACT) which is an average of the activity values for the L preceding frames;

means for calculating STD(ACT) which is a standard deviation of the activity values for the L preceding frames; and means for deciding the value of the quantization mode signal as:

$M = 1$    if $ACT < AVE(ACT)$ 2    if $AVE(ACT) \leq ACT < AVE(ACT) + STD(ACT)$ 3    if $AVE(ACT) + STD(ACT) \leq ACT < AVE(ACT) + 2STD(ACT)$ 4    if $AVE(ACT) + 2STD(ACT) \leq ACT$.

10. A video signal encoding system for encoding a video signal to provide an encoded signal, wherein the video signal includes a multiplicity of frames, each frame containing a number of slices, each slice being divided into a plurality of macroblocks, each macroblock having blocks of pixels, the video signal encoding system comprising:

means for encoding the video signal on a block-by-block basis to generate blocks of transform coefficients;

means for determining a quantization parameter for each macroblock;

means for deciding a quantization mode signal which represents an activity of the video signal;

means for classifying transform coefficients included in each block into high frequency coefficients and low frequency coefficients based on the quantization mode signal;

means for modifying the high frequency coefficients, to thereby provide blocks of modified transform coefficients including the low frequency coefficients and the modified high frequency coefficients; and means for quantizing the blocks of modified transform coefficients by using the quantization parameter, wherein the modification means includes means for dividing the high frequency coefficients by A, A being a number of a value larger than 1.0.

11. The video signal encoding system of claim 10, wherein the decision means includes means for calculating a variance of pixel values in a processing frame included in the video signal.

12. The video signal encoding system of claim 11, wherein the decision means further includes means for calculating an average of squares of differential pixel values which are calculated by subtracting pixel values of a predicted frame of the processing frame obtained by using a motion estimation and compensation technique from the pixel values of the processing frame.

13. The video signal encoding system of claim 12, wherein the decision means further includes:

means for counting an amount of bits used in representing an encoded processing frame, to thereby provide a bit amount B; and means for providing a bit amount ratio BR defined as BR=B/(TR/FR), wherein TR is a transmission rate of the video signal encoding system and FR is a frame rate thereof.

14. The video signal encoding system of claim 13, wherein the quantization mode signal has an integer value M ranging from 1 to 4; a block of transform coefficients is represented as F(i,j)'s, i and j being integers ranging from 0 to 7, respectively; and F(i,j)'s are classified as the low frequency coefficients, if (i+j) is smaller than K1, K2, K3 and K4 for M=1, 2, 3 and 4, respectively, K1, K2, K3, and K4 being positive integers with $K4 \leq K3 \leq K2 \leq K1$.

15. The video signal encoding system of claim 14, wherein K1, K2, K3 and K4 are 15, 12, 10 and 8, respectively.

16. The video signal encoding system of claim 14, wherein the decision means further includes:

means for calculating an activity value ACT according to $$ACT = W1 \times V_I + W2 \times V_D + W3 \times BR$$

wherein $V_I$, $V_D$ and BR represent the variance, the average of the squares and the bit amount ratio, respectively; and W1, W2 and W3 are predetermined weight values; and means for selecting the value of the quantization mode signal based on the activity value.

17. The video signal encoding system of claim 16, wherein the selection means for deciding the quantization mode signal as:

$$M = 1 \quad \text{if } ACT < TH1$$
$$2 \quad \text{if } TH1 \leq ACT < TH2$$
$$3 \quad \text{if } TH2 \leq ACT < TH3$$
$$4 \quad \text{if } TH3 \leq ACT$$

wherein TH1, TH2 and TH3 are predefined threshold values, respectively.

18. The video signal encoding system of claim 16, wherein the selection means contains:

means for storing the activity values for L preceding frames of the processing frame, L being a positive integer;

means for calculating AVE(ACT) which is an average of the activity values for the L preceeding pages;

means for calculating STD(ACT) which is a standard deviation of the activity values for the L preceding frames; and means for deciding the value of the quantization mode signal as:

$$M = 1 \quad \text{if } ACT < AVE(ACT)$$
$$2 \quad \text{if } AVE(ACT) \leq ACT < AVE(ACT) + STD(ACT)$$
$$3 \quad \text{if } AVE(ACT) + STD(ACT) \leq ACT < AVE(ACT) + 2STD(ACT)$$
$$4 \quad \text{if } AVE(ACT) + 2STD(ACT) \leq ACT.$$

* * * * *